United States Patent [19]

Hashiguchi et al.

[11] 3,805,292

[45] Apr. 16, 1974

[54] MAGNETIC RECORDING DISC USING A MAGNETIC SHEET HELD ON A STRETCHED FLEXIBLE SHEET

[75] Inventors: Susumu Hashiguchi; Tetsuo Hino, both of Hirakata, Japan

[73] Assignee: Matsushita Electric Industrial Co., Ltd., Kadoma, Osaka, Japan

[22] Filed: July 21, 1972

[21] Appl. No.: 273,967

[30] Foreign Application Priority Data

| | | |
|---|---|---|
| July 29, 1971 | Japan | 46-57364 |
| July 23, 1971 | Japan | 46-55343 |
| July 23, 1971 | Japan | 46-55345 |

[52] U.S. Cl. .......... 360/135, 360/99

[51] Int. Cl. .......... G11b 5/82

[58] Field of Search. 179/100.2 P, 100.2 A, 100.22; 340/174.1 E; 346/74 MD, 137; 178/6.6 DD

[56] References Cited

UNITED STATES PATENTS

| | | | |
|---|---|---|---|
| 3,599,226 | 8/1971 | Lips | 346/137 |
| 3,037,205 | 5/1962 | Hagopian | 179/100.2 P |
| 3,537,083 | 10/1970 | Voth | 179/100.2 A |
| 3,336,583 | 8/1967 | Comstock | 179/100.2 P |

*Primary Examiner*—Bernard Konick
*Assistant Examiner*—Robert S. Tupper
*Attorney, Agent, or Firm*—Wenderoth, Lind & Ponack

[57] ABSTRACT

A magnetic recording disc comprises a magnetic sheet for recording and reproducing signals by a magnetic head, a rotating disc, a flexible sheet carried by a ring, and a holding means. The flexible sheet is mounted on the rotating disc by the ring so as to form a flat and tensional surface. The magnetic sheet is held on the flexible sheet by the holding means so that the magnetic sheet is in close contact with the magnetic head along with the flat and tensional surface of the flexible sheet mounted on the rotating disc.

5 Claims, 7 Drawing Figures

MAGNETIC RECORDING DISC USING A MAGNETIC SHEET HELD ON A STRETCHED FLEXIBLE SHEET

FIELD OF THE INVENTION

This invention relates to a magnetic recording disc, and more particularly to a magnetic recording disc in which a magnetic sheet for recording and reproducing electric signals is easily held on a rotating disc and is easily removed therefrom.

Recently, magnetic recording discs have been widely used for recording signals such as digital information, video signals and the like. Conventional discs for magnetic recording are very expensive because it is necessary that the surface of the magnetic recording disc be finished and kept exactly flat in order to get best recording results. Moreover, maintenance of the magnetic recording disc is very troublesome, and it is difficult to replace the disc with a new one while maintaining the flatness of the surface of the disc.

Therefore, it has been desired to develop a magnetic recording disc in which the magnetic recording medium can be kept precisely flat by a simple construction and which can be easily replaced.

Particularly, when the magnetic recording disc is used for recording and reproducing electric signals at different rotating speed of the disc, it is necessary that there be no difference in the magnetic head pressure with respect to the magnetic sheet.

Therefore, an object of this invention is to provide a new magnetic recording disc in which the magnetic recording medium is held partly on a flexible sheet which is mounted on a rotating disc and which can be provided with a flat and tensional surface by an evenly distributed radial force controlled by a ring, so that the magnetic sheet is in close contact with a magnetic head. Further, the magnetic sheet can be replaced essily without handling the rotating disc. The magnetic recording disc according to the present invention comprises a magnetic sheet for recording and reproducing electric signals by a magnetic head, a rotating disc which is rotated by a driving means, partially and holding means holding said magnetic sheet on said rotating disc. The rotating disc has a flexible sheet stretched neatly between an annular projection and a center projection thereof by a uniform radial force controlled by a ring attached to said rotating disc, whereby said magnetic sheet is placed on said flexible sheet stretched by said uniform radial force and is in close contact, at the portion between said annular projection and said center projection, with said magnetic head during the recording and reproducing operations.

BRIEF DESCRIPTION OF THE DRAWINGS

This invention will be better understood by reference to the following description when considered in connection with the accompanying drawings wherein.

DETAILED DESCRIPTION OF THE INVENTION

Figure 1:
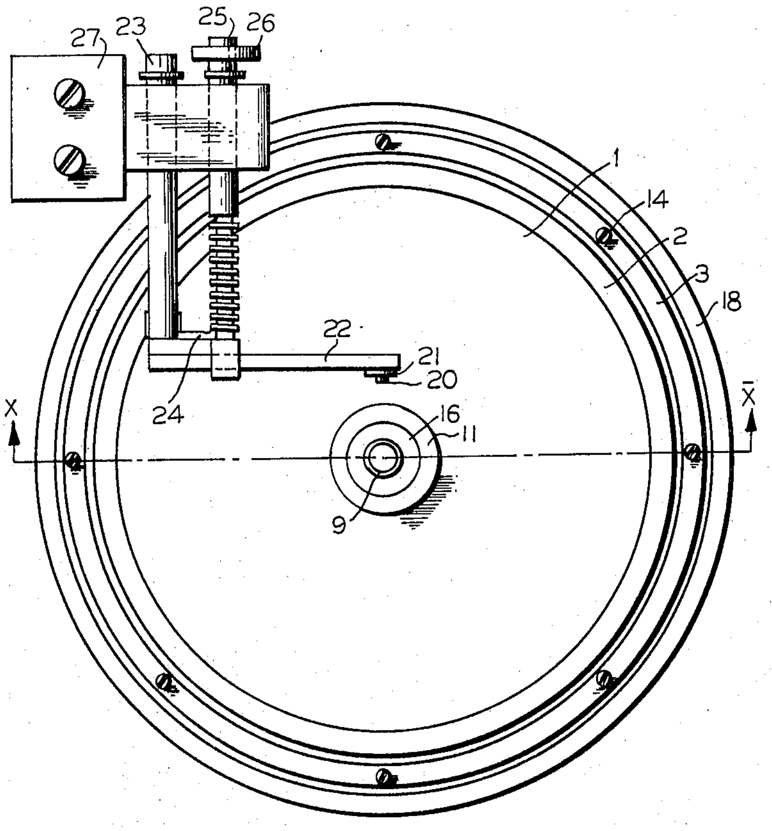
FIG. 1 is a plan view of one form of a magnetic recording disc according to this invention.
Figure 2:
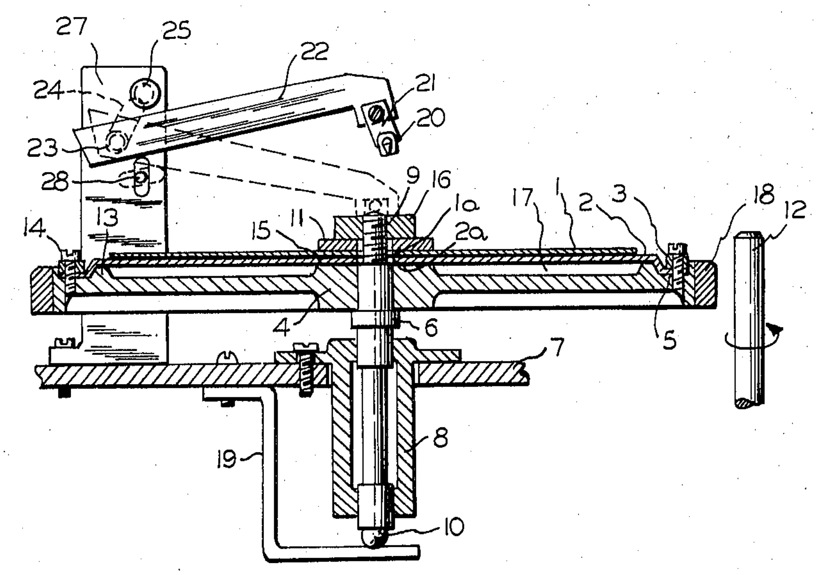
FIG. 2 is a cross-sectional view taken along the line X—X of FIG. 1 and viewed in the direction of the appended arrows.

Referring now to FIGS. 1 and 2, the construction of one form of a magnetic recording disc according to the invention is described.

A magnetic sheet 1 for recording and reproducing electric signals thereon by a magnetic head 20 is formed in the shape of a thin disc, and the center thereof is cut out to provide a hole 1a. The center of a flexible sheet 2 is adapted to form a flat and tensional surface is also cut out to provide a hole 2*a*. A ring 3 is provided in annular groove 5 formed near the periphery of a rotating disc 4 for mounting the flexible sheet 2 on the rotating disc 4. The diameter of ring 3 is nearly equal to that of the flexible sheet 2. The rotating disc 4 has an annular projection 13 which along with the inside of the annular groove 5 is used for stretching the flexible sheet 2.

A shaft 6 thrusts passes through the rotating disc 4 at the center thereof, and is rotatably held by a bearing 8 fixed on deck 7. A top part 9 of the shaft 6 projecting through the rotating disc 4 is threaded and is used as a clamp pole. The bottom of the shaft 6 is supported on a plate 19 by a rotatable steel ball 10 so that the rotating disc 4 can be smoothly rotated by a driving means.

A motor (not shown) directly coupled to the shaft 6 may be used for driving the rotating disc 4 at high speed. Alternatively, a capstan 12 placed at the periphery of the rotating disc 4 can be used for driving the rotating disc 4 at low speed. The periphery of the rotating disc 4 is covered with an elastic material 18 so as to prevent slippage between the capstan 12 and the periphery of the rotating disc 4.

Figure 3:
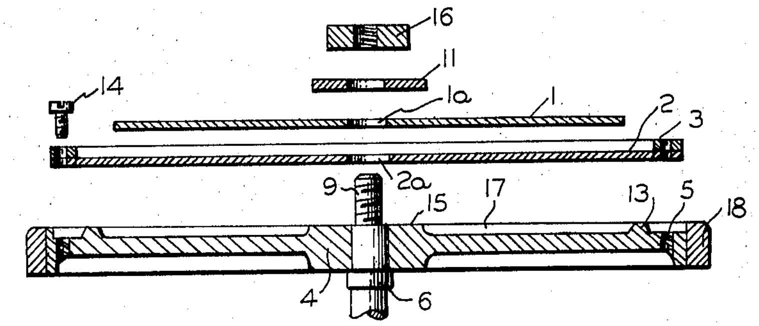
FIG. 3 shows the manner in which the main parts of the magnetic recording disc shown in FIG. 1 are assembled.

The following is a description of how the main parts of the magnetic recording disc shown in FIGS. 1 and 2 are assembled. Referring to FIG. 3:

The flexible sheet 2 is pasted on the ring 3. Then, the ring 3 is fixed on the rotating disc 4 so as to form the flat and tensional surface thereof, by applying an evenly distributed radial force to the flexible sheet 3 by the use of the annular projection 13 of the rotating disc 4.

Figure 4:
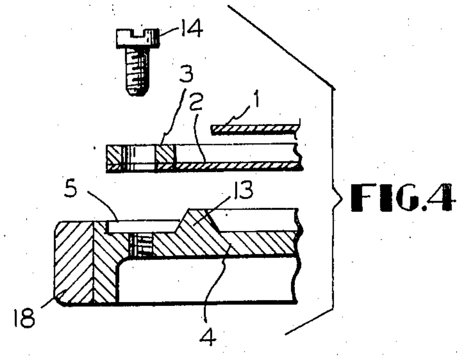
FIGS. 4 and 5 together show the manner in which the flexible sheet is mounted on the rotating disc to form a flat and tensional surface.
Figure 5:
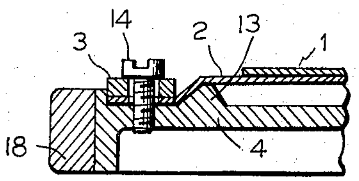

This last step will now be described in more detail with reference to FIGS. 4 and 5.

The periphery of the flexible sheet 2 is pasted to the under surface of the ring 3 lightly but without allowing any slack in the flexible sheet 2. Then, the ring 3 is forced into the annular groove 5 of the rotating disc 4 by screws 14. Consequently, the flexible sheet 2 mounted on the rotating disc 4 is forced over the annular projection 13, as shown in FIG. 5, and an evenly distributed radial force is applied to the flexible sheet 2. Therefore, the flexible sheet 2 is stretched and placed under tension.

By driving a pair of the plurality of screws, which are placed symmetrically about the center of the rotating disc 4, a little at a time, the flexible sheet 2 mounted on the rotating disc 4 can be provided with a tensioned and perfectly flat surface. In order to get close contact between the magnetic head and the magnetic sheet during recording and reproducing operations of the magnetic recording disc, the uniform radial force is adjusted so that at zero rotation speed of the rotating disc the magnetic recording sheet is dented by 10 to 500$\mu$ by means of the weight of the magnetic head. Thus, assembly of a rotating disc is completed.

The magnetic sheet 1 is held on the flexible sheet 2 of the rotating disc assembly, as shown in FIG. 2. The rotating disc 4 has a center projection 15 having the same height as that of the annular projection 13. The magnetic sheet 1 held on the flexible sheet 2 of the rotating disc assembly is fixed to the center projection 15 of the rotating disc 4 together with a holding plate 11 by a nut 16 used as a clamp knob screwed onto the screw 9. Accordingly, the magnetic sheet 1 is in contact with the magnetic head 20 closely along with the flat and tensional surface of the flexible sheet 2. Therefore, the touch of the magnetic head 20 with respect to the magnetic sheet 1 is stable, and there is no fluctuation of the surface of the magnetic sheet caused by centrifugal force or air pressure. This is true even at high speed rotation of the rotating disc assembly.

The magnetic head 20 is in touch with the magnetic sheet 1 at the position 17 between the annular projection 13 and the center projection 15 of the rotating disc 4. Further, the magnetic head 20 is held by a magnetic head assembly. It is fixed to a holding base 21 which in turn is fixed to a holding arm 22. The holding arm 22 holds the magnetic head 20 so that it can be removed from the magnetic sheet 1, and is fixed to a holding shaft 23. A head locating pin 24, which is also fixed to the holding shaft 23, is geared to the groove of a screw shaft 25 and defines the position of the magnetic head 20. A roller 26 set to the screw shaft 25 is used for manually changing a recording track position to be recorded or reproduced by the magnetic head 20. The holding shaft 23 and the screw shaft 25 are held by a base block 27 fixed to the deck 7.

By the use of the magnetic head assembly described above, the magnetic head 20 can be held in contact with the magnetic sheet 1. A cam 28 is arranged as shown by a dashed line in FIG. 2 so that the magnetic head 20 is in contact with the magnetic sheet 1 when the signals are recorded on or reproduced from the magnetic sheet 1 rotating at a predetermined speed. When the rotation of the magnetic sheet 1 is stopped, the cam 28 is set in the state shown by the solid line in FIG. 2 so as to remove the magnetic head 20 from the magnetic sheet 1.

Accordingly, by the constructions of the magnetic disc assembly and the magnetic head assembly described above, the magnetic sheet 1 is closely and stably held in contact with the magnetic head 20 along with the flat and tensional surface of the flexible sheet 2 mounted on the rotating disc 4. As stated above, this is true high or low speed rotation of the magnetic sheet 1. More particularly, at high speed rotation of the magnetic disc assembly, the magnetic sheet 1 is stretched tightly by centrifugal force and is closely fitted to the surface of the flexible sheet 2 so that a very flat surface is formed. On the other hand, at low speed rotation of the magnetic disc assembly, the touch of the magnetic head 20 with respect to the magnetic sheet 1 is stable even if the flexible sheet 2 has some surface deformations, because the magnetic head 20 is mounted on the holding arm 22 so as to follow any surface deflections. Thus, either at high or low speed rotation of the magnetic sheet 1, the recording or reproducing of the signals is performed without a change in the touch of the magnetic head 20 to the magnetic sheet 1. The touching force of the magnetic head 20 to the magnetic sheet 1 can be easily adjusted by changing the weight of the magnetic head 20.

Surface deflection of the magnetic sheet 1, caused by surface deformations of the flexible sheet 2, can be held to a minimum by finishing the top of the annular projection 13 of the rotating disc 4 on a lathe. Thus, by precision finishing the annular projection 13, long life of the magnetic sheet 1 can be obtained. For example, each of the circular recording tracks on the magnetic sheet 1 can be used for more than 200 hours.

The shape of the magnetic sheet 1 is not limited to that of a circle, but, as is obvious, almost any polygonally shaped sheet may be used without substantially affecting the disc shown in FIGS. 1 and 2. It is also clear that the flexible sheet 2 mounted on the rotating disc 4 may be put under tension without providing the annular projection on the rotary disc. This can be accomplished, for example, by clamping the flexible sheet under tension to a ring which can be mounted on the rotating disc 4. After the flexible sheet is clamped on the rotating disc 4, the flexible sheet will not slack even if the force used to tension the sheet is removed.

A plastic film such as a polyethylene terephthalate film, or a flexible metal film such as aluminum film may be used for the flexible sheet 2. In addition a plastic base can be used which is similar to the magnetic sheet but which has no magnetic material coated thereon. It is of course possible to use the magnetic sheet itself for the flexible sheet 2. The flexible sheet 2 keeps its flat and tensional surface for a long time after it is mounted on the rotating disc 4 and put under tension.

Moreover, the replacement of the magnetic sheet 1 with a new one is very easy because the magnetic sheet 1 is held on the flexible sheet 2 and is fixed to the rotating disc 4 only at the center thereof. That is, the magnetic sheet 1 is free from the tension applied to the flexible sheet 2. Accordingly, the cost of replacing the magnetic sheet is very low.

Figure 6:
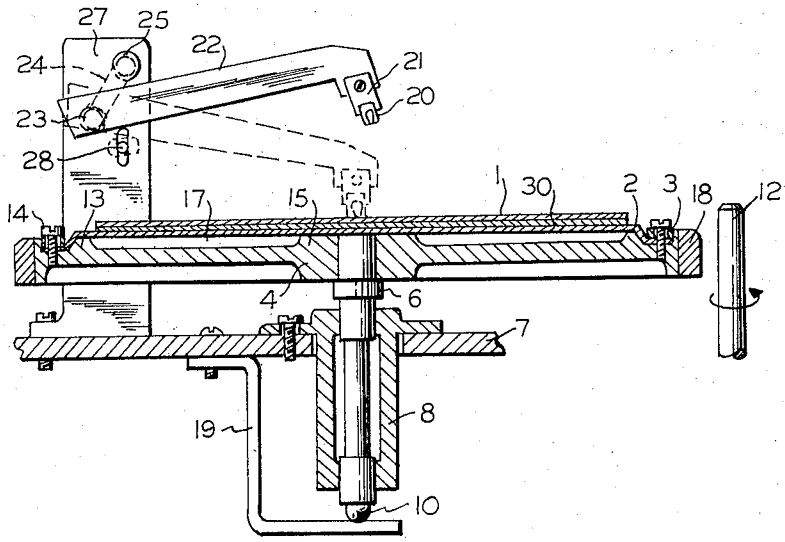
FIG. 6 is a cross-sectional view similar to FIG. 2 of another form of a magnetic recording disc according to this invention.

Another form of a magnetic recording disc according to this invention is shown in FIG. 6, wherein the magnetic sheet 1 is held partly on the flexible sheet 2 by using connecting material 30 such as a silicon grease applied between the magnetic sheet 1 and the flexible sheet 2, wherein the connecting material 30 acts to attach the magnetic sheet 1 to the flexible sheet 2 in a manner that the magnetic sheet 1 will not slip off from the flexible sheet 1. The connecting material my be applied to sheet 2 above only part of the periphery of the annular or center projection, or and/or the center projection, and it may be applied above the entire area of the projections therefore, the magnetic sheet 1 is held on the flexible sheet 2 freely from the tension applied to the flexible sheet 2. In this embodiment, the clamp pole 9 projecting from the rotating disc 4 shown in FIG. 2 is not needed for fixing the magnetic sheet 1 onto the flexible sheet 2, and is therefore omitted as shown in FIG. 6. As in the first embodiment, the magnetic sheet 1 is held on the flexible sheet 2 and has a very flat surface as a result of the flat and tensional surface of the flexible sheet 2.

Figure 7:
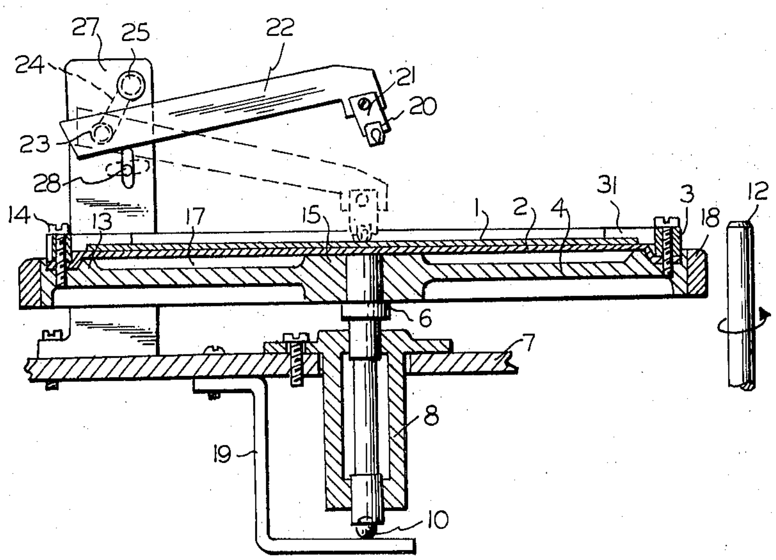
FIG. 7 is a cross-sectional view similar to FIG. 2 of still another form of a magnetic recording disc according to this invention.

A further form of a magnetic recording disc according to this invention is shown in FIG. 7, wherein the holding means for holding the magnetic sheet 1 on the flexible sheet 2 comprises a frame 31 provided on the ring 3. The magnetic sheet 1 is inserted between the frame 31 of the ring 3 and the flexible sheet 2, and is thus held on the flexible sheet 2. In this embodiment, the magnetic sheet 1 is free from the tension applied to the flexible sheet 2.

It will be apparent from the foregoing that while a particular form of this invention has been illustrated and described, various modifications can be made without departing from the spirit and scope of the invention as defined by the appended claims.

What we claim is:

1. A magnetic recording disc comprising a rotating disc for rotation by a driving means, said disk having a center projection and an annular projection radially spaced from said center projection; an annular ring having a flexible sheet connected thereto, said ring being connected to said disc near the periphery thereof; a magnetic sheet supported by said flexible sheet for recording and reproducing electric signals by a magnetic head; said flexible sheet being stretched flatly and evenly between said center and annular projections by a uniform radial force when said ring is connected to said rotating disc; and means for holding, freely from the tension applied to said flexible sheet, at least a part of said magnetic sheet on said flexible sheet, whereby when said flexible sheet is stretched by said uniform radial force, a portion of said magnetic sheet lying between the center and annular projections is in close contact with said magnetic head during the recording or reproducing operation.

2. A magnetic recording disc as claimed in claim 1 wherein said uniform radial force is controlled by forcing said flexible sheet over said annular projection by fastening said ring to said rotating disc.

3. A magnetic disc as claimed in claim 1 wherein said magnetic sheet is partly held on said flexible sheet by a clamp pole extending through said flexible sheet and said magnetic sheet from said center projection and a clamp knob coupled to said clamp pole.

4. A magnetic recording disc as claimed in claim 1 wherein said magnetic sheet is partly held on said flexible sheet by a connecting material applied to said flexible sheet above at least part of said annular projection or said center projection.

5. A magnetic recording disc as defined in claim 1 wherein said holding means comprises a frame mounted on the periphery of said rotating disc and having said magnetic sheet held thereby.

* * * * *